United States Patent
Exner et al.

(10) Patent No.: US 12,080,156 B2
(45) Date of Patent: Sep. 3, 2024

(54) COMPUTER SYSTEM AND METHOD FOR PROVIDING WILDFIRE EVACUATION SUPPORT

(71) Applicant: Sony Group Corporation, Tokyo (JP)

(72) Inventors: Peter Exner, Malmö (SE); Hannes Bergkvist, Rydeback (SE)

(73) Assignee: SONY GROUP CORPORATION, Tokyo (JP)

( * ) Notice: Subject to any disclaimer, the term of this patent is extended or adjusted under 35 U.S.C. 154(b) by 88 days.

(21) Appl. No.: 17/892,083

(22) Filed: Aug. 21, 2022

(65) Prior Publication Data

US 2023/0078676 A1 Mar. 16, 2023

(30) Foreign Application Priority Data

Sep. 15, 2021 (SE) .................................. 2151131-6

(51) Int. Cl.
*G08B 7/06* (2006.01)
*B64C 39/02* (2023.01)
(Continued)

(52) U.S. Cl.
CPC ............ *G08B 7/066* (2013.01); *B64C 39/024* (2013.01); *G05D 1/106* (2019.05); *G08B 17/125* (2013.01);
(Continued)

(58) Field of Classification Search
CPC ..... G08B 7/066; G08B 17/125; H04W 4/024; H04W 4/90; H04W 4/025; G05D 1/106;
(Continued)

(56) References Cited

U.S. PATENT DOCUMENTS

| | | | | |
|---|---|---|---|---|
| 5,832,187 A | * | 11/1998 | Pedersen | G08B 17/005 706/900 |
| 10,655,968 B2 | * | 5/2020 | Rezvani | G06T 17/05 |
| 10,777,051 B1 | * | 9/2020 | Kumar | B64D 47/02 |
| 11,748,901 B1 | * | 9/2023 | Knuffman | G06T 7/579 345/419 |

(Continued)

FOREIGN PATENT DOCUMENTS

| | | |
|---|---|---|
| KR | 20210015104 A | 2/2021 |
| KR | 20210101362 A | 8/2021 |
| WO | 2021174291 A1 | 9/2021 |

OTHER PUBLICATIONS

Office Action and Search Report from corresponding Swedish Application No. 2151131-6, mailed on Apr. 12, 2022, 8 pages.

*Primary Examiner* — Zhen Y Wu
(74) *Attorney, Agent, or Firm* — Tucker Ellis LLP

(57) ABSTRACT

A computer system in included in a system for providing wildfire evacuation support. The computer system operates to obtain sensor data that represents a wildfire in a target region from a UAV which is deployed within the target region, obtain a current location of an individual in a hazardous situation in the target region, and obtain a desired destination for the individual in the target region. Based on the sensor data, the computer device identifies one or more danger zones that pose a fire-related threat to the individual, and determines at least one evacuation path that extends from the current location to the desired destination while avoiding the one or more danger zones. The computer system may be located at the UAV or on a central computer resource in communication with the UAV.

20 Claims, 4 Drawing Sheets

(51) Int. Cl.
*G05D 1/00* (2006.01)
*G08B 17/12* (2006.01)
*H04W 4/02* (2018.01)
*H04W 4/024* (2018.01)
*H04W 4/90* (2018.01)
*B64U 101/00* (2023.01)
*B64U 101/30* (2023.01)

(52) U.S. Cl.
CPC ........... *H04W 4/024* (2018.02); *H04W 4/025* (2013.01); *H04W 4/90* (2018.02); *B64U 2101/00* (2023.01); *B64U 2101/30* (2023.01); *B64U 2201/10* (2023.01)

(58) Field of Classification Search
CPC .............. B64C 39/024; B64U 2201/10; B64U 2101/00; B64U 2101/30
USPC ......................................................... 340/577
See application file for complete search history.

(56) References Cited

U.S. PATENT DOCUMENTS

| | | | |
|---|---|---|---|
| 2011/0130636 A1* | 6/2011 | Daniel .................... | H04Q 9/00 709/201 |
| 2017/0059343 A1* | 3/2017 | Spinelli .................. | G01C 21/20 |
| 2018/0195868 A1* | 7/2018 | Rezvani ................ | G01C 21/343 |
| 2018/0228448 A1* | 8/2018 | Miyazawa ............. | H04M 11/00 |
| 2018/0242106 A1* | 8/2018 | Miyazawa ............. | H04W 4/80 |
| 2019/0353492 A1* | 11/2019 | Mathew ............. | G01C 21/3697 |
| 2020/0155882 A1* | 5/2020 | Tohidi ....................... | G06N 7/01 |
| 2020/0159397 A1* | 5/2020 | Tohidi ................. | G06F 3/04847 |
| 2020/0288532 A1* | 9/2020 | Wang ..................... | G06T 19/00 |
| 2020/0324895 A1* | 10/2020 | Ghio .................... | A62C 3/0242 |
| 2021/0183214 A1* | 6/2021 | Attariani ............. | G06Q 10/083 |
| 2021/0269151 A1* | 9/2021 | Bartz ................. | A62C 3/0257 |
| 2021/0286999 A1* | 9/2021 | Raucher ................ | B64C 39/024 |
| 2022/0080236 A1* | 3/2022 | Choi ..................... | A62C 29/00 |
| 2022/0090927 A1* | 3/2022 | Shear ................ | G01C 21/3492 |
| 2022/0129681 A1* | 4/2022 | Anand .................. | G06V 20/17 |
| 2022/0363383 A1* | 11/2022 | Tanaka .................. | B64D 47/02 |

* cited by examiner

COMPUTER SYSTEM AND METHOD FOR PROVIDING WILDFIRE EVACUATION SUPPORT

RELATED APPLICATION DATA

The present application claims the benefit of Swedish Patent Application No. 2151131-6, filed Sep. 15, 2021, the content of which is incorporated herein by reference in its entirety.

TECHNICAL FIELD

The present disclosure relates generally to providing evacuation support for individuals that are present at a wildfire and, in particular, to the use of unmanned aerial vehicles for this purpose.

BACKGROUND ART

Wildfires are among the most common forms of natural disaster in some regions, including Siberia, California, and Australia. Areas with Mediterranean climates or in the taiga biome are particularly susceptible. With increasing impact of climate change, wildfires are expected to be more prominent in these and other regions around the world. Wildfires involve fierce combustion that generates intense heat and large amounts of smoke and gas, which may cause damage to property and human life. Humans trapped in a wildfire may have slim chances of escaping by themselves, given that it is often difficult for a person located within a wildfire to perceive the extent and development of the wildfire.

While there are systems for detecting and monitoring wildfires and for guiding firefighters into a wildfire, there is no system for safely guiding individuals out of a wildfire.

There is thus a general need to support the evacuation of individuals that are trapped in a wildfire. Preferably, such evacuation support should not require the use of wireless electronic devices carried by the individuals, not only since wireless communication may be disrupted within or around the wildfire but also since individuals without a wireless electronic device would be unable to get proper evacuation support.

BRIEF SUMMARY

It is an objective to at least partly overcome one or more limitations of the prior art.

Another objective is to provide a technique of safely guiding individuals, optionally travelling by vehicle, out of a wildfire.

Yet another objective is to provide such a technique that is capable of guiding any and all individuals out of the wildfire.

One or more of these objectives, as well as further objectives that may appear from the description below, are at least partly achieved by a computer system for providing wildfire evacuation support according to the independent claims, embodiments thereof being defined by the dependent claims.

Still other objectives, as well as features, aspects and technical effects will appear from the following detailed description, from the attached claims as well as from the drawings.

DETAILED DESCRIPTION OF EXAMPLE EMBODIMENTS

Figure 1:
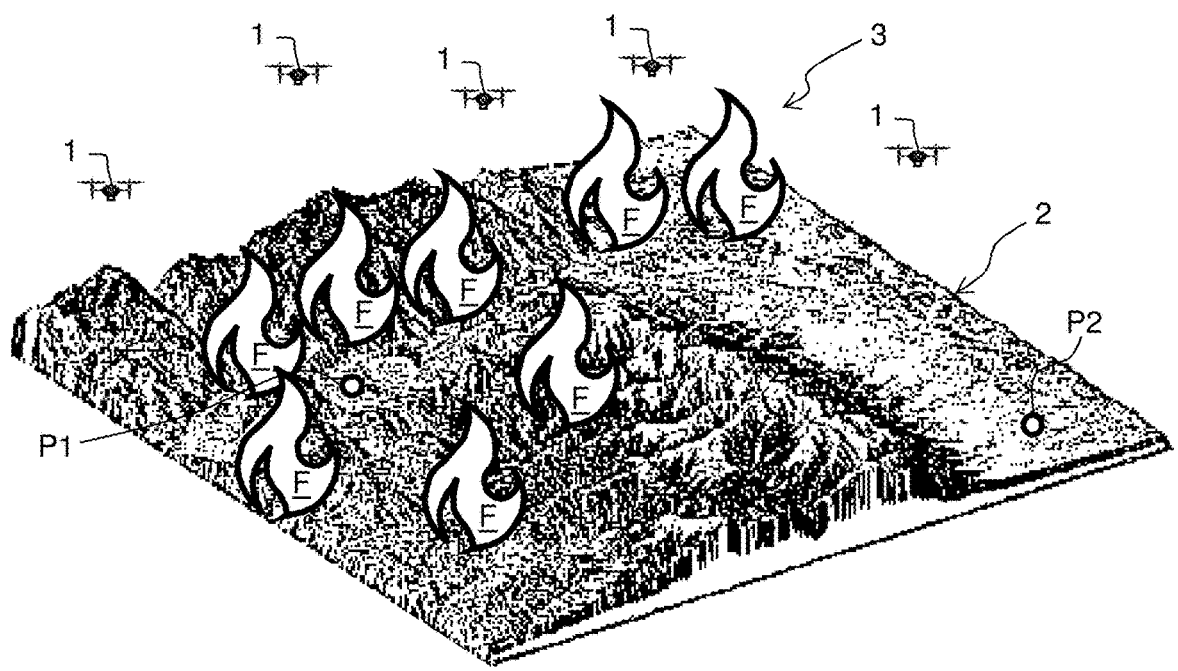
FIG. 1 is a perspective view of a target region comprising a wildfire.

Embodiments will now be described more fully hereinafter with reference to the accompanying schematic drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, the terms "multiple", "plural" and "plurality" are intended to imply provision of two or more items, whereas the term a "set" of items is intended to imply a provision of one or more items. The term "and/or" includes any and all combinations of one or more of the associated listed items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numerals refer to like elements throughout.

Before describing embodiments in more detail, a few definitions will be given.

As used herein, "wildfire" refers to an unplanned, unwanted or uncontrolled fire in an area of combustible vegetation. The wildfire may affect rural areas and/or urban areas. A wildfire may comprise one or more "confined fires". A confined fire denotes a coherent area of flaming and/or smoldering combustion which is physically separated from other confined fires, if present.

As used herein, "unmanned aerial vehicle" (UAV) refers to an aircraft controlled by an onboard automated control system, a ground-based control system or by a ground-based human pilot. Such an aircraft is also known as "uncrewed aerial vehicle" or drone.

Embodiments will be exemplified with reference to FIG. 1, which depicts a plurality of drones 1 that are operated within a geographic region 2 ("target region") that contains a wildfire 3. In the illustrated example, the wildfire 3 comprises a plurality of confined fires F. It should be understood that the nature of the wildfire 3 may change over time, in terms of extent and intensity. For example, new confined fires F may arise, a confined fire may be split up, or two confined fires may merge, etc. The example in FIG. 1 is thus a snapshot of the wildfire 3 that ravages the region 2.

Any individual that is located within or in the vicinity of the wildfire 3 is at risk of being injured or even killed by the heat and/or gases generated by the wildfire 3 or by secondary risks such as explosions, falling trees, etc. FIG. 1 depicts the location P1 of an individual who is in a hazardous situation, by being trapped inside the wildfire 3. As noted in the Background section, an individual in this situation is often unable to grasp the full extent of the wildfire 3 and find a safe way out, for example to a destination P2. As disclosed herein, the drones 1 may be operated to gather information about the wildfire 3, and possibly other relevant information, to enable a computer system to determine one or more evacuation paths for individuals in peril. The computer system may also provide evacuation guidance to the individual, for example via the drones 1.

Any reference to an individual in the following is equally applicable to a group of individuals. Thus, an evacuation path may be determined for a group of individuals and evacuation guidance may be provided collectively to such a group.

Figure 2A:
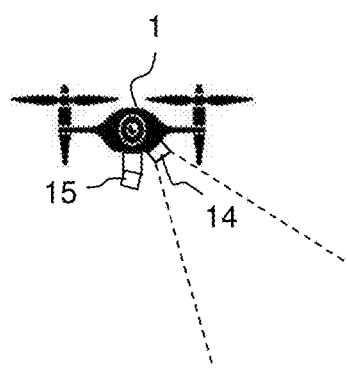
FIGS. 2A-2B comprise a side view and a block diagram of an example drone used in a wildfire evacuation support system.
Figure 2B:
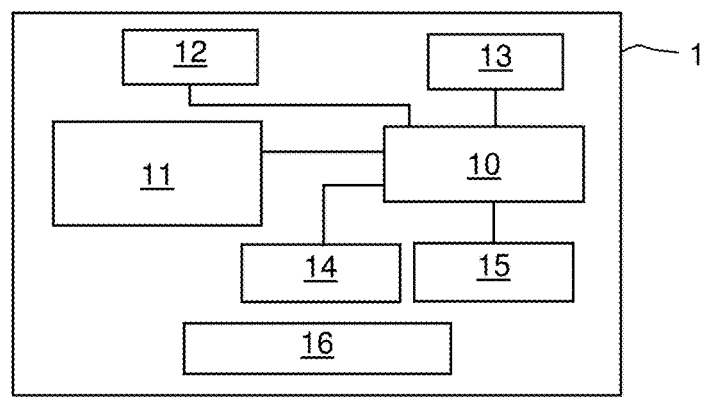

FIG. 2A is a side view of an example drone 1 that may be used for this purpose, and FIG. 2B is a schematic block diagram of such a drone 1. The drone 1 may be of conventional construction but may include a sensor system (below) that is tailored to the mission of the drone 1. The drone 1 comprises a control system 10, which is circuitry for controlling the overall operation of the drone 1. The drone 20 further comprises a conventional propulsion system 11 for generating thrust force to move the drone 1 through the air. The drone further comprises a positioning system 12 for determining the position of the drone 1. In some embodiments, the positioning system 12 includes a Global Navigation Satellite System (GNSS) receiver. The GNSS receiver may be configured for communication with a satellite navigation system such as GPS, GLONASS, Galileo or BeiDou. The positioning system 12 may further comprise an altimeter. The control system 10 is configured to receive position data from the positioning system 12, and optionally further data from various conventional sensors on the drone 1, and control the propulsion system 11 to move the drone on a flight path, which may or may not be predefined. For example, the control system 10 may include a conventional flight controller.

The control system 10 is also connected to a communication system 13 for wireless data transmission. In some embodiments, the communication system 13 comprises a transceiver for short-range wireless communication, for example by one or more of Bluetooth, BLE, WiFi, LR-WPAN, UWB, ZigBee, Z-Wave, ANT, ANT+, 6LoWPAN, WirelessHART, ISA100, etc. The short-range communication may be utilized for data communication with other drones 1 (cf. FIG. 8C). Alternatively or additionally, the communication system 13 may comprise a transmitter or transceiver for long-range wireless communication. Such long-range communication may utilize any available communication technology, proprietary or standardized, including but not limited to GSM, EDGE, HSDPA, W-CDMA, CDMA, TDMA, LTE, 5G, Wi-MAX, LORAN, etc. Alternatively or additionally, the long-range communication may involve satellite communication. The long-range communication may be utilized for data communication with a remote computer (cf. FIGS. 8A-8B).

The control system 10 is further connected to a sensor system 14, which comprises one or more sensors capable of generating data representative of the wildfire 3. In some embodiments, the sensor system 14 comprises one or more sensors for remote monitoring of heat, temperature, or topography beneath the drone 1, and thus within at least part of the wildfire 3. Such a sensor may be operable to generate 1D, 2D or 3D representations ("images") of the terrain beneath the drone 1, in one or more spectral regions. FIG. 2A illustrates a drone 1 having a camera 14', which may be moveable or fixed. The field of view of the camera 14' is indicated by dashed lines. The camera 14' may be responsive to radiation in at least one of the visible and infrared spectral regions. The camera 14' may be an optical camera, a thermographic camera, a multispectral camera, a hyperspectral camera, a stereoscopic camera, etc. The sensor system 14 may include more than one camera, for example cameras configured for different spectral regions. Alternatively or additionally, the sensor system 14 may comprise a radar-based system such as a SAR system (synthetic-aperture radar) and/or a LIDAR system (light detection and ranging). Other sensors may also be included in the sensor system 14, such as an air temperature sensor, an air pressure sensor, a smoke or gas detector, a wind speed sensor, a wind direction sensor, etc.

The control system 10 is further connected to a guidance system 15, which is operable to provide cognitive guidance for an individual, for example by use of light or sound. In some embodiments, the guidance system 15 comprises one or more speakers operable to generate audible instructions for the individual. In some embodiments, the guidance system 15 comprises one or more light emitters operable to project light onto the ground to generate a guiding light pattern.

The components of the drone 1 are powered by a power source 16, which may include one or more of a battery, a fuel cell, an energy-harvesting unit, a fuel tank, etc.

Figure 3:
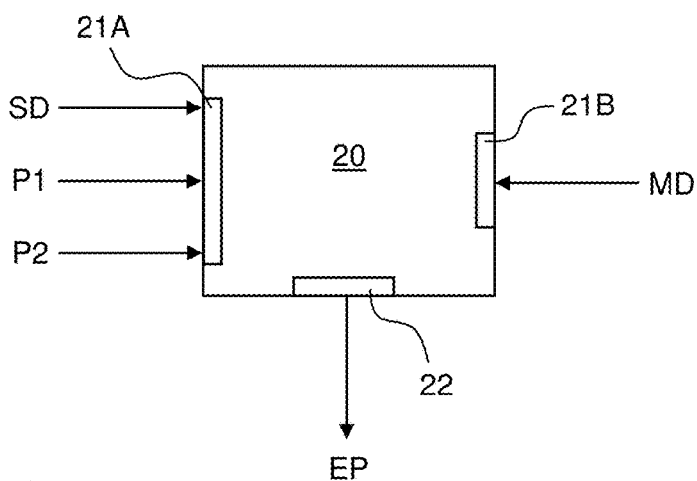
FIG. 3 is a schematic view of an example computer system used in a wildfire evacuation support system.

FIG. 3 is a block diagram of an example computer system 20, which is configured to determine and output one or more evacuation paths EP for an individual deemed to be in a hazardous situation in relation to a wildfire. The computer system 20 comprises one or more input interfaces 21A, 21B for receiving input data and an output interface 22 for providing output data. The interfaces 21A, 21B, 22 may be of any type. The input interfaces 21A, 21B generally define an "input" of the computer system 20. As shown, the computer system 20 is configured to receive sensor data SD, which is generated by one or more drones 1 to represent the wildfire 3 in the region 2 (FIG. 1). The computer system 1 may also receive location data P1 for an individual (cf. FIG. 1) and location data P2 for a desired destination of the individual away from the wildfire 3 (cf. FIG. 1). As will be described below, the computer system 20 may alternatively derive P1 and/or P2 from SD. Further, as shown, the computer system 20 may receive metadata MD related to the region 2. Examples of MD and its use are given hereinbelow.

In some embodiments, the computer system 20 is implemented on a computer resource located remotely from the drones 1 and the region 2, for example on a server or cloud computer. In other embodiments, the computer system 20 is implemented on one or more of the drones 1, for example as part of the control system 10. Implementation examples are described below with reference to FIGS. 8A-8C.

Figure 4:
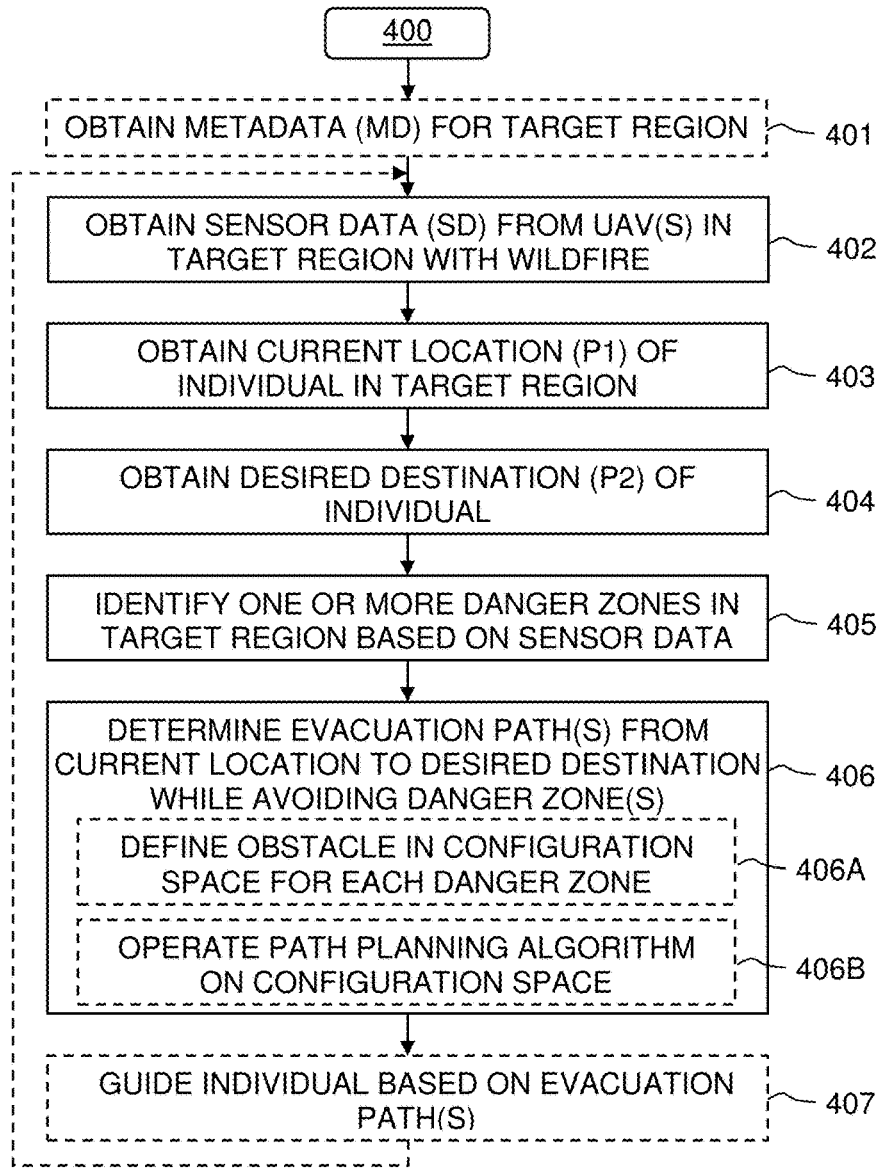
FIG. 4 is a flow chart of an example method for wildfire evacuation support.

FIG. 4 is a flow chart of an example method 400 of providing evacuation guidance in relation to a wildfire by use of one or more drones. The method 400 may be computer-implemented and performed by the computer system 20 in FIG. 3. Optional steps and flows are represented by dashed lines in FIG. 4. The method will be described with reference to the scenario in FIG. 1.

In step 401 (optional), the above-mentioned metadata MD is obtained. For example, MD may represent the topography of the region 2, the current and future weather situation in the region 2, buildings or other facilities in the region 2, roads and walkways in the region 2, storage locations for hazardous material, the type of hazardous material in the respective storage location, etc. MD may be obtained by the computer system 20 from an external resource, such as one or more remote computers. Alternatively, at least part of MD may be pre-stored in a memory unit that is accessed by the computer system 20.

In step 402, sensor data SD is obtained from one or more of the drones 1 that are being deployed within the target region 2. SD is generated by the respective drone 1 to represent at least the wildfire. In some embodiments, SD is representative of the location and extent of the respective confined fire F within the wildfire 3. Such sensor data will enable identification of danger zones in step 405 below. In some embodiments, SD is further representative of the intensity of one or more confined fires F. In this context, "intensity" refers to the amount of heat released by the fire. The intensity of the fire may be used in step 406 to determine a safe evacuation path for the individual. The intensity of a fire may be estimated from an infrared image of the fire. Depending on sensor system 14 (FIG. 2B), SD may represent additional information, such as the location of individuals, the type of transportation that is available to the respective individual, the topography of the target region 2, the weather situation in the target region 2, etc.

The sensor data SD may include raw data generated by the sensor system 14 and/or pre-processed data. In some embodiments, SD represents real-time images generated by the sensor system 14. As explained above, such images may be 1D, 2D or 3D representations of the terrain beneath the drone 1. In this context, "real-time" implies that SD is obtained by step 402 within a short time period from the detection of the images by the sensor system 14, for example within less than 1-5 minutes. In some embodiments, SD represents infrared images, which contain a distribution of temperature within the target region 2, or part thereof. It should be noted that SD need not include raw images but may include pre-processed images or data extracted from the images by pre-processing.

In step 403, a current location P1 of an individual in the target region 2 is obtained. The location P1 may be provided to the computer system 20 as input data separate from SD, as shown in FIG. 3. For example, P1 may be given by a wireless signal from a transponder or other electronic device carried by the individual or installed in a vehicle used by the individual. Such a signal may be intercepted by a drone 1 or another device, and the corresponding location P1 may be provided as input data to the computer system 20. Alternatively, P1 may be included in SD. For example, P1 may be determined by the above-mentioned pre-processing and provided as part of SD.

In some embodiments of step 403, the computer system 20 detects the individual and determines the current location P1 of the individual based on SD. Such embodiments have the advantage of making the detection of individuals in distress independent of transponders and external systems. For example, the computer system 20 may process one or more images included in SD to detect the individual in the respective image, for example by use of conventional image processing, and may map the location of the individual in the respective image to a physical location in a coordinate system of the target region 2, for example in GNSS coordinates. This mapping may be based on the location and orientation of the drone 1, and optionally the orientation of the camera 14' (FIG. 2A), when the respective image was captured, and possibly the topography of the target region 2.

In step 404, a desired destination P2 for the individual is obtained. P2 may be predefined and included in MD. Alternatively, a firefighter in the target region 2 may enter P2 into an external system, which provides the destination as input data to the computer system 20. In another alternative, P2 is determined by processing one or more images captured by the sensor system 14 on the drone 1. It is also conceivable that the computer system 20 determines P2 based on a configuration space that is defined in step 406A (below).

In step 405, one or more danger zones are identified in the target region 2 based on SD. The respective danger zone is considered to pose a fire-related threat to the individual. The danger zone(s) may be detected by the above-mentioned pre-processing and included in the sensor data SD that is received by the computer system 20. Alternatively, the computer system 20 may identify or detect the danger zone(s) by processing SD, for example by processing one or more images included in SD. One example of a danger zone is a fire, such as any one of the confined fires F in FIG. 1. The location and extent of a fire may be detected in an image, for example an infrared image, by conventional image processing. Another example of a danger zone is a building that may explode and/or disseminate hazardous material as a result of the wildfire. Such a danger zone may be indicated in MD. Alternatively, it may be detected in an image, optionally in combination with information about the type of building, for example if it contains explosive and/or hazardous material. The latter information may be given by MD. Examples of buildings that may pose a fire-related risk include gas stations, power plants, industrial plants, etc.

In step 406, the computer system 20 determines at least one evacuation path EP that extends from P1 to P2 while avoiding the danger zone(s) that were identified in step 405. It is conceivable that the computer system 20 determines a plurality of evacuation paths, optionally ranked by preference, for example in terms of the risk for the individual.

In step 407, the computer system 20 causes the individual to be guided from the current location P1 based on the evacuation path(s) determined in step 406. In some embodiments, the individual is guided by use of one or more of the drones 1. For example, the control system 20 may cause a drone 1 to activate its guidance system 15 to indicate the evacuation path to the individual. Alternatively or additionally, the control system 20 may cause one or more drones 1 to fly at low altitude to guide the individual along the evacuation path. It is also conceivable that a plurality of drones 1 are operated in a formation to guide the individual along the evacuation path. Step 407 need not guide the individual by use of drones 1. In an alternative, the computer system 20 causes information about the evacuation path to be transmitted to an electronic device that is carried by the individual or installed in a vehicle used by the individual. The vehicle may be manually operated by the individual or be an autonomous vehicle, such as a self-driving car, which is configured automatically follow the evacuation path received from the computer system 20. As used herein, "guide an individual" also includes guiding a vehicle on which the individual is located.

The method 400 may be performed once to determine one or more evacuation paths from P1 to P2, whereupon the evacuation path(s) may be used by the computer system or by another system to guide the individual from P1 towards P2. By determining more than one evacuation path, it is possible to switch between evacuation paths if the conditions within the target region should change as the individual is guided towards P2.

In some embodiments, as indicated by a dashed arrow in FIG. 4, step 406 and at least some of steps 402-405 are repeated to enable the evacuation path(s) to be updated to account for changes over time, as the individual moves through the target region 2. Steps 402 and 405 may be repeated so that the evacuation path(s) are determined by step 406 in view of changes of the danger zones in the target region, a change of transportation type (for example, if a vehicle breaks down), etc. Step 403 may be repeated so that the evacuation path(s) are determined by step 406 for a new current location P1 of the individual. Thereby, the method 400 will track the movement of the individual and repeatedly determine relevant evacuation paths in relation the current location of the individual. Step 404 may be repeated so that the evacuation path(s) are determined by step 406 for an updated destination P2. Thereby, the method 400 will adapt to changes of the wildfire 3 that necessitate a change of destination.

In some embodiments, as indicated by dashed lines in FIG. 4, the method 400 comprises a step 406A of representing each of the one or more danger zones as an obstacle in a configuration space of a path planning algorithm (PPA), and a step 406B of operating the PPA to determine the evacuation path(s). The term "path planning" refers to the computational problem of computing a continuous path that connects a start configuration and a goal configuration, while avoiding collision with known obstacles. Path planning is also known as motion planning, the navigation problem, or the piano mover's problem. Conventionally, a PPA operates on a configuration space, which is defined to comprise a set of configurations that avoids collisions with obstacles, denoted "free space", and the complement of the free space, denoted "obstacle region". Any suitable PPA may be used to determine the evacuation path(s) in steps 406A-406B, for example a grid-based search algorithm, an interval-based search algorithm, a geometric algorithm, an artificial potential field algorithm, or a sampling-based algorithm. Commonly used PPAs include rapidly-exploring random tree, probabilistic roadmap, and variants thereof.

Figure 5:
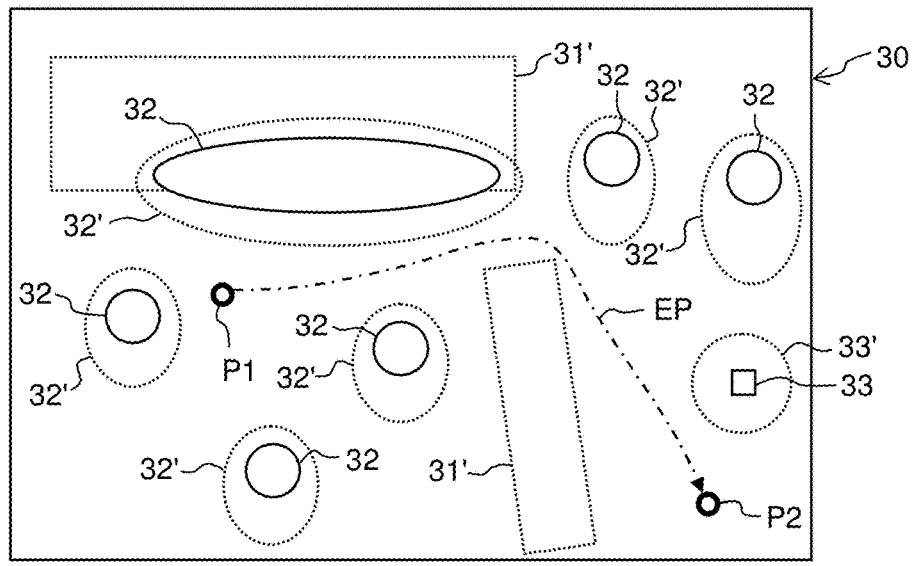
FIG. 5 shows an example configuration space that corresponds to the target region in FIG. 1 and is defined for a path planning algorithm operable to determine an evacuation path.

FIG. 5 is a schematic view of an example configuration space 30 defined for the target region 2 in FIG. 1 and also indicates an evacuation path EP that has been determined for the configuration space 30. The configuration space 30 corresponds to the target region 2 and comprises a number of obstacles represented by dotted lines. Some obstacles may correspond to physical obstacles in the target region 2, such as mountains, impenetrable terrain, buildings, etc. For example, the rectangular obstacles 31' in FIG. 5 correspond to hillsides or mountain ranges in FIG. 1. Other obstacles may correspond to the above-mentioned danger zones. In FIG. 5, danger zones corresponding to fires are indicated by reference numeral 32, and a danger zone corresponding to a storage facility for hazardous material is indicated by reference numeral 33. The corresponding obstacles in the configuration space 30 are represented by dotted lines and indicated by reference numeral 32' and 33', respectively.

While an obstacle may be defined to have the same location and extent as a danger zone, it may be advantageous to define the obstacle with a margin to the danger zone, as indicated in FIG. 5. The margin may correspond to a "safety distance" to the danger zone and will ensure the safety of the individual along the evacuation path.

For a danger zone 32 that represents a fire, the margin may be set to ensure that an individual is not exposed to excessive heat at the border of the obstacle 32'. In one example, the margin may be increased with increasing intensity of the fire. In another example, the margin may be set based on a rate and/or direction of spreading of the respective confined fire. The intensity, rate of spreading and direction of spreading are characteristics of the wildfire 3 that may be determined by processing of one or more images captured by the sensor system 14. In a further example, the margin may be set in view of wind data, such as wind speed and/or wind direction, and optionally in view of the terrain. As noted above, the sensor system 14 may be configured to measure wind speed/direction. Alternatively, wind speed/direction may be included in the MD. The wind speed/direction may also be used when defining an obstacle in the configuration space to ensure that the individual is not exposed to an unhealthy or fatal amount of smoke and gaseous substances at the border of the obstacle. FIG. 5 schematically indicates a wind direction W. As seen in FIG. 5, by comparing the obstacles 32' with their danger zones 32, the margin is extended in the wind direction W. It may also be noted that the wind speed is expected to be lower immediately behind the mountain range, which is represented by a large rectangular object 31, causing the margin to be less extended in the wind direction for the danger zone 32 that is located at the foot of the mountain range.

For a danger zone that does not represent an actual fire but rather a risk of explosion and/or emission of hazardous substances when reached by a fire, the margin may be set to ensure that an individual is not harmed by the explosion or the emission of hazardous substances at the border of the obstacle, should the explosion or emission occur during the evacuation of the individual. In FIG. 5, danger zone 33 is a gas station, and the corresponding obstacle 33' is defined with an equal margin in all directions from the danger zone 33, although the margin may also be set based on wind speed and/or wind direction, terrain, etc. With reference to FIG. 4, it is to be noted that the margin may differ between repetitions of step 406, as the characteristics of the wildfire 3 may change over time.

Figure 6:
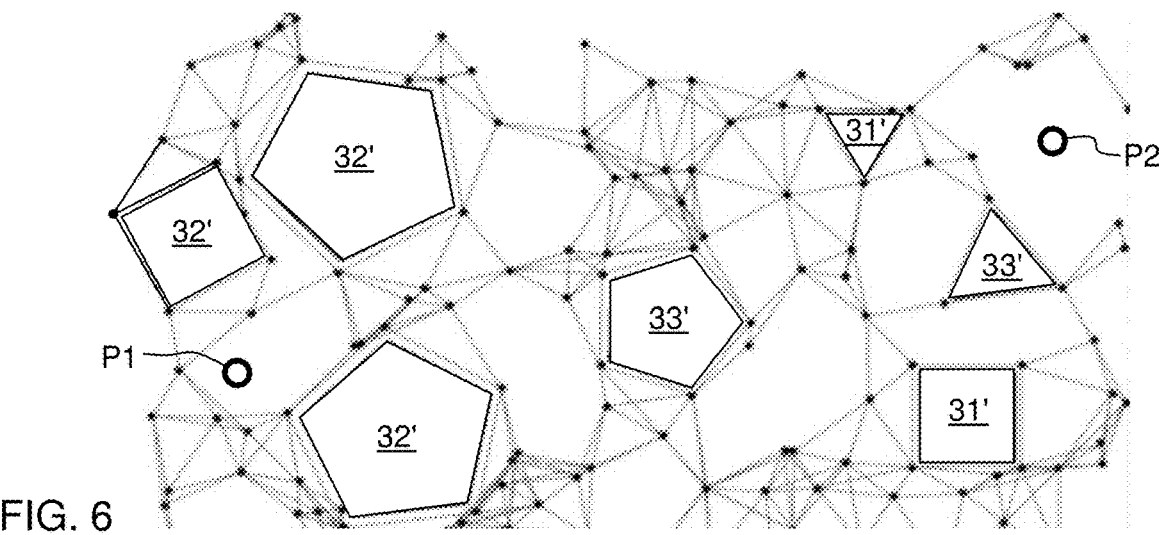
FIG. 6 shows an example of a configuration space with obstacles, nodes and connections generated for a target region during operation of a probabilistic roadmap algorithm.

FIG. 6 shows an example of a probabilistic roadmap that has been generated for another configuration space comprising a number of obstacles 31' corresponding to physical objects 31, a number of obstacles 32' corresponding to fires, and a number of obstacles 33' corresponding to risks for explosion and/or emission. In FIG. 6, the obstacles 31', 32', 33' are defined as polygonal objects but may be of any conceivable shape, for example circular or oval as in FIG. 5. The roadmap in FIG. 6 has been calculated by a PPA in step 406B. The roadmap is represented as a graph of dots (nodes), which are connected by lines. The lines correspond to sub-paths that can be traversed by the individual in the target region. As seen, all dots and lines are located outside of the obstacles 31', 32', 33'. Each line may be assigned a weight, for example depending on the terrain along the line, the proximity to an obstacle, the mode of transportation (see below), etc. In step 406B, the roadmap may then be queried by any suitable search algorithm to determine one or more evacuation paths from P1 to P2. The search algorithm may be configured to find an evacuation path that fulfils one or more objectives, for example to minimize distance or transit time from P1 to P2, or to optimize safety for the individual. Non-limiting examples of search algorithms for finding the shortest path include Dijkstra's algorithm, the Bellman-Ford algorithm, and the Floyd-Warshall algorithm.

Figure 7A:
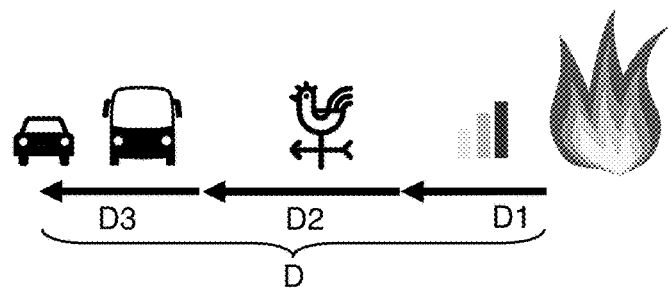
FIGS. 7A-7B illustrate example calculations of margin to a danger zone.
Figure 7B:
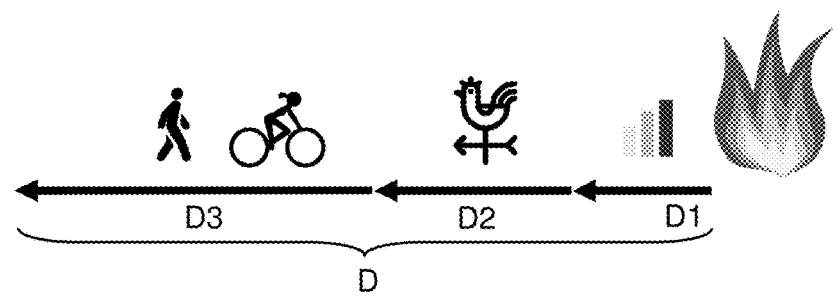

Reverting to step 406 in FIG. 4, the computer system 20 may also account for the mode of transportation that the individual will use when moving from P1 to P2. The mode of transportation ("transportation type") may be given by SD. For example, the computer system 20 may determine the transportation type by image processing for object detection and object classification. Alternatively, the transportation type may be indicated by a transport parameter that has been generated by the above-mentioned pre-processing and included in SD. In some embodiments, the margin may be adjusted based on a shielding parameter associated with the transportation type. The shielding parameter may represent how well the respective transportation type protects the individual. For example, the individual may travel on foot (no vehicle), or by vehicle such as by bicycle, motorbike, car, bus, lorry, military vehicle, helicopter, etc. Any number of transportation types may be used. FIGS. 7A-7B exemplify the use of two transportation types: unshielded and shielded. FIG. 7A illustrates distances D1-D3 that may be set and accumulated into a margin D in relation to a danger zone. D1 represents a first distance given by fire intensity, D2 represents a second distance given by wind speed and fire rate, and D3 represents a third distance for a transportation type that will shield the individual (large shielding parameter), such as a closed vehicle, here exemplified as a car or bus. In FIG. 7B, D1 and D2 are the same as in FIG. 7A, but D3 is extended since the individual uses a transportation type that will not shield the individual (small shielding parameter), here exemplified as an individual on foot or on a bicycle. Different shielding parameters may be used for the same transportation type for different types of danger zones, for example if the danger zone represents a fire, an explosion hazard, or a risk for emissions of hazardous substances.

There are other conceivable ways of accounting for transportation type in step 406.

In some embodiments, if the individual has access to a vehicle, step 406 accounts for the size of the vehicle when determining the evacuation path(s), for example by adjusting the margin based on the size and/or by excluding terrain that is not compatible with the vehicle (see below).

In some embodiments, step 406 involves determining the evacuation path(s) based on an estimated speed of the transportation type. The estimated speed may be predefined for each transportation type. For example, the estimated speed may be applied if an evacuation path is to be determined in the configuration space based on transit time from P1 to P2. Further, some potential evacuation paths might only be open during a short time window in view of the predicted spreading of a fire, and the estimated speed may be used to determine if a potential evacuation path is viable or not.

The estimated speed may also be used to prioritize when to provide guidance to different individuals in the target region 2. For example, individuals with a low estimated speed may be prioritized over individuals with a high estimated speed, or vice versa.

The estimated speed may also influence the repetition rate of step 406 (and further steps) in the method 400. The need to update the evacuation path may be less relevant for an individual traveling at higher speed since the travel time from P1 to P2 is likely to be smaller. Thus, the repetition rate may be decreased with increasing estimated speed.

In some embodiments, step 406 involves excluding terrain that is untraversable for the transportation type. For example, an individual on foot may have other options to travel from P1 to P2 compared to an individual on a bicycle or an individual in a car. For example, untraversable terrain may be represented as physical obstacles (31' in FIGS. 5-6) in the configuration space. Thus, the physical obstacles may differ depending on transportation type. Alternatively or additionally, as noted above with reference to FIG. 6, the probabilistic roadmap algorithm may assign weights to sub-paths in the configuration space based on transportation type. If the weight is assigned to represent how suitable the terrain along the respective sub-path is for the transportation type, this approach may effectively exclude terrain that is untraversable for the transportation type and even prioritize fast pathways for the respective transportation type. The skilled person realizes that transportation type may be correspondingly integrated into other PPAs by use of weights or corresponding adjustment factors.

If the transportation type is not identified by the method 400, the computer system 20 may be configured to presume that all individuals use one transportation type, for example being on foot.

Figure 8A:
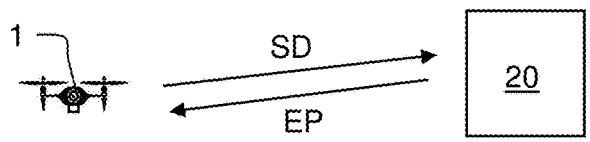
FIGS. 8A-8C show examples of data transfer in a wildfire evacuation support system comprising one or more drones.
Figure 8B:
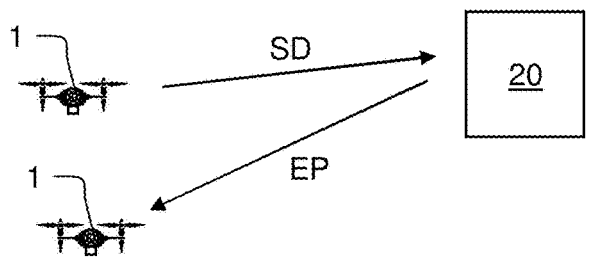
Figure 8C:
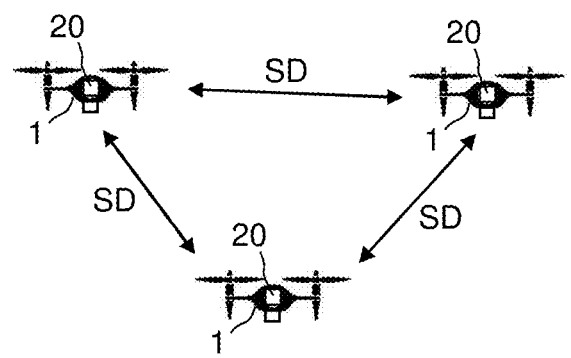

FIGS. 8A-8C depict different implementations of a wildfire evacuation support system comprising one or more drones 1.

FIG. 8A shows a first centralized implementation, in which the computer system 20 is implemented on a remote device, for example a server or a cloud computer. The sensor data SD is generated by the respective drone 1 and transmitted by wireless communication to the computer system 20. With reference to FIG. 3, it may be noted that P1 and/or P2 may be included in or given by SD, whereas the computer system 20 may obtain MD elsewhere, for example from an external computer device (not shown). It is likewise conceivable that the computer system 20 obtains P1 and/or P2 from the external computer device. As indicated in FIG. 5, the computer system 20 is configured to determine one or more evacuation paths EP, by use of the method 400, and return EP to the respective drone 1. The drone 1 may thereby be caused to guide the individual along EP, optionally together with other drones (not shown).

FIG. 8B shows a second centralized implementation which differs from FIG. 8A in that the computer system 20 transmits EP to another drone 1 than the one providing SD. In one example, a guidance system may include drones that are dedicated to data collection, and drones that are dedicated to providing evacuation guidance. In another example, the computer system 20 may actively determine the drone 1 to receive EP among a group of drones, for example based on current drone position, drone heat resistance, drone functionality, etc.

It is also conceivable that the computer system 2 merges SD from a plurality of drones and determines the evacuation path(s) based on the merged information.

In a variant, the computer system 20 returns EP to the drone 1, as in FIG. 8A, whereupon the drone 1 negotiates with other drones, by drone-to-drone communication, to decide on the drone(s) to guide the individual along EP.

In a third centralized implementation, not shown, the computer system 20 is located on a master drone among a plurality of drones that are deployed in the target region. The master drone may be configured to obtain SD from its sensor system, as well as receive SD from the other drone(s) by short-range wireless communication. The master drone may be configured to determine EP based on the available SD. The master drone may also be configured to select one or more drones to guide the individual along EP and communicate EP to the selected drone(s). With reference to FIG. 3, P1 and/or P2 may be given by SD or received from a remote computer (not shown), for example by wireless communication. MD may also be obtained from the remote computer or be pre-stored in internal memory of the master drone.

FIG. 8C shows a distributed implementation, in which the computer system 20 is located on a plurality of drones 1 which are deployed in the target region. Each drone 1 generates its own SD and determines EP at least partly based on this SD. As indicated in FIG. 8C, drones 1 may be configured to exchange SD, for example by wireless short-range communication, and determine EP based on all available SD. Alternatively, each drone 1 may be configured to only use its own SD to determine its own EP, whereupon it exchanges its EP with the other drones. The respective drone may also be configured to negotiate with other drones to decide on the drone(s) to guide the individual along EP. If there are several different individuals to be guided, the drones may also negotiate to select the drone(s) to guide the respective individual. With reference to FIG. 3, P1 and/or P2 may be given by SD or received from a remote computer (not shown), for example by wireless communication. MD may also be obtained from the remote computer or be pre-stored in internal memory of the respective drone 1.

In some embodiments of the distributed implementation, the drones 1 collaborate in creating a heatmap of the target region 2, based on images captured by one or more cameras on the respective drone. The heatmap may represent one or more of temperature, topography, individuals, buildings, roads, vehicles, etc. The heatmap is continuously shared and updated as the drones move across the target region 2. Thereby all drones have access to the same heatmap. The respective drone 1 matches the heatmap to a geographical map of the target region 2 (for example, included in MD). The geographical map may represent roads, terrain, buildings, storages of hazardous material, etc. As understood from the forgoing, the respective drone operates a PPA to determine one or more evacuation paths, based on one or more of: 1) wildfire rate of spreading and direction, 2) mode of transportation, 3) estimated speed of the vehicle, for example top speed, 4) shielding parameter, 5) available routes, including paths usually not travelled by vehicles such as walkways and bicycle roads, and 6) a safe distance to fire and other risks.

After determination of the evacuation path(s) in a distributed or centralized implementation, evacuation guidance may be provided by one drone per individual or group of individuals, or by having several drones form up and create a visual and/or audible path for safe evacuation. During evacuation, the respective drone may actively detect unexpected dangers, by use of its sensor system, and guide the individual(s) around such dangers. Such unexpected dangers may include fallen trees or other blocking objects, or approaching vehicles that may be hidden to the individual(s).

In a variant of FIG. 8C, each drone 1 autonomously uses its own SD to determine its own EP and provides guidance accordingly.

It may be noted that short-range wireless communication between drones is not likely to be affected by the wildfire. Should a disruption occur, the drones may simply increase their altitude to reduce the impact of the wildfire. For long-range wireless communication, even if cellular communication may be disrupted within or around the wildfire, the drones may use another communication technology or a drone may intermittently move away from the wildfire and within range of an operative cellular network to communicate with the remote computer.

Figure 9:
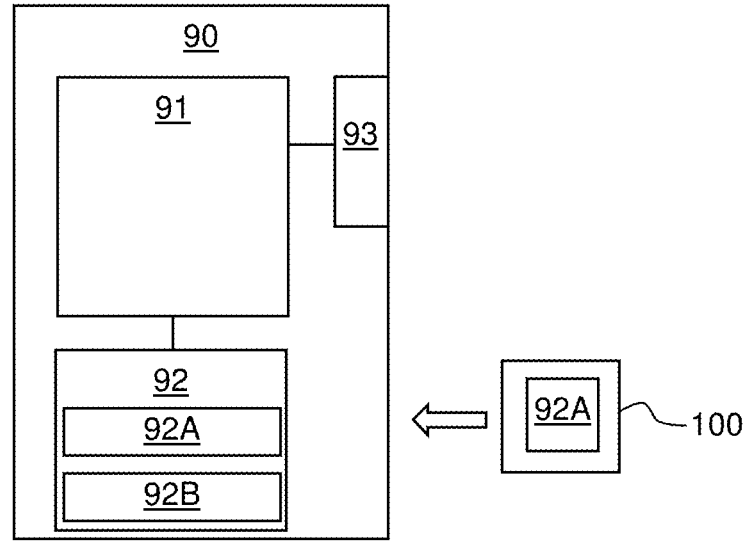
FIG. 9 is a block diagram of an example of the computer system in FIG. 3.

The computer system 20 may be implemented by one or more software-controlled computer resources. FIG. 9 schematically depicts such a computer resource 90, which comprises a processing system 91, computer memory 92, and a communication interface 93 for input and/or output of data. The computer resource 90 may or may not be a unitary device. The processing system 91 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 92A comprising computer instructions is stored in the memory 92 and executed by the processing system 91 to perform any of the methods, operations, functions or steps described in the foregoing. As indicated in FIG. 9, the memory 92 may also store control data 92B for use by the processing system 92. The control program 92A may be supplied to the computer resource 90' on a computer-readable medium 100, which may be a tangible (non-transitory) product (e.g. magnetic medium, optical disk, read-only memory, flash memory, etc.) or a propagating signal.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

In the following, clauses are recited to summarize some aspects and embodiments as disclosed in the foregoing.

C1. A computer system for providing wildfire evacuation support, said computer system comprising: an input (83) for receiving sensor data (SD) generated by at least one unmanned aerial vehicle (1) while deployed within a target region (2) that contains a wildfire (3), the at least one unmanned aerial vehicle (1) being configured to generate, by use of one or more sensors (15), said sensor data (SD) that represents the wildfire (3) within the target region; at least one processor (81) connected to said input (83) and configured to: obtain a current location (P1) of an individual in a hazardous situation in the target region (2); obtain a desired destination (P2) for the individual in the target region (2); identify, based on the sensor data (SD), one or more danger zones (32, 33) in the target region (2), the one or more danger zones (32, 33) posing a fire-related threat to the individual; and determine at least one evacuation path (EP) that extends from the current location (P1) to the desired destination (P2) while avoiding the one or more danger zones (32, 33).

C2. The computer system of C1, wherein the sensor data (SD) is representative of a location and extent of one or more confined fires (F) within the wildfire (3), and an intensity of the one or more confined fires (F).

C3. The computer system of C1 or C2, which is configured to obtain the current location (P1) of the individual by detecting the individual and determining the current location (P1) of the individual based on the sensor data (SD).

C4. The computer system of any preceding clause, wherein the sensor data (SD) represents real-time images.

C5. The computer system of C4, wherein the real-time images comprise infrared images.

C6. The computer system of any preceding clause, which is configured to cause the at least one unmanned aerial vehicle (1) to guide the individual based on the at least one evacuation path (EP).

C7. The computer system of any preceding clause, which is further configured to: represent each of the one or more danger zones (32, 33) as an obstacle (32', 33') in a configuration space (30) of a path planning algorithm, and operate the path planning algorithm to determine the at least one evacuation path (EP).

C8. The computer system of C7, wherein a respective danger zone (32, 33) among the one or more danger zones (32, 33) corresponds to a confined fire (32) within the wildfire (3), or a storage (33) of hazardous material.

C9. The computer system of C7 or C8, which is configured to define the obstacle (32', 33') with a margin (D) to the respective danger zone (32, 33), wherein the margin (D) represents a safe distance between the individual and the respective danger zone (32, 33), wherein the computer system (20) is configured to set the margin (D) based on at least one of wind data and a characteristic of the wildfire (3).

C10. The computer system of C9, which is configured to determine the characteristic of the wildfire (3) based on the sensor data (SD).

C11. The computer system of C9 or C10, wherein the characteristic comprises at least one of: a rate of spreading, a fire intensity, or a direction of spreading.

C12. The computer system of any one of C9-C11, which is further configured to: determine, based on the sensor data (SD), a mode of transportation of the individual and determine the margin (D) based on a shielding parameter associated with the mode of transportation.

C13. The computer system of any one of C1-C11, which is further configured to: determine, based on the sensor data (SD), a mode of transportation of the individual and determine the at least one evacuation path (EP) based on the mode of transportation.

C14. The computer system of C13, which is configured to determine the at least one evacuation path (EP) based on an estimated speed of the mode of transportation.

C15. The computer system of C13 or C14, which is configured to determine the at least one evacuation path (EP) while excluding terrain in the target region (2) that is untraversable by the mode of transportation.

C16. The computer system of any preceding clause, which is located on an unmanned aerial vehicle (1).

C17. The computer system of any preceding clause, which is configured to repeatedly obtain the current location (P1) of the individual, and optionally the desired destination (P2), identify the one or more danger zones (32, 33) in the target region (2), and determine said at least one evacuation path (EP), such that said at least one evacuation path is updated over time as the individual moves through the target region (2).

C18. A system for providing wildfire evacuation support, said system comprising a plurality of unmanned aerial vehicles (1), and the computer system of any preceding clause, wherein the computer system is located on at least one of the unmanned aerial vehicles (1), and wherein the unmanned aerial vehicles (1) are configured to exchange the sensor data (SD) among themselves by wireless transmission.

C19. A computer-implemented method of providing wildfire evacuation support, said method comprising: obtaining (402) sensor data generated by one or more sensors on at least one unmanned aerial vehicle operated within a target region that contains a wildfire, the sensor data representing the wildfire within the target region; obtaining (403) a current location of an individual in a hazardous situation in a target region that contains a wildfire; obtaining (404) a desired destination in the target region; identifying (405), at least partly based on the sensor data, one or more danger zones in the target region, the one or more danger zones posing a fire-related threat to the individual; and determining (406) at least one evacuation path that extends from the current location to the desired destination while avoiding the one or more danger zones.

C20. A computer-readable medium comprising computer instructions which, when executed by at least one processor (81), cause the at least one processor (81) to the perform the method of C19.C21. An unmanned aerial vehicle for deployment within a target region (2) that contains a wildfire (3), the unmanned aerial vehicle comprising one or more sensors (15) and being configured to: generate, by use of the one or more sensors (15), sensor data (SD) that represents the wildfire (3) within the target region (2); obtain a current location (P1) of an individual in a hazardous situation in the target region (2); obtain a desired destination (P2) for the individual in the target region (2); identify, based on the sensor data (SD), one or more danger zones (32, 33) in the target region (2), the one or more danger zones (32, 33) posing a fire-related threat to the individual; and determine at least one evacuation path (EP) that extends from the current location (P1) to the desired destination (P2) while avoiding the one or more danger zones (32, 33).

C22. The unmanned aerial vehicle of C21, which is included among a plurality of unmanned aerial vehicles for deployment within the target region (2), wherein the unmanned aerial vehicle is further configured to receive, from one or more further unmanned aerial vehicles among said plurality of unmanned aerial vehicles, further sensor data that represents the wildfire (3) within the target region (2), wherein the unmanned aerial vehicle is configured to identify the one or more danger zones based on the sensor data and the further sensor data.

C23. The unmanned aerial vehicle of C22, which is further configured to: select at least one unmanned aerial vehicle among the plurality of unmanned aerial vehicles, and cause the at least one unmanned aerial vehicle to guide the individual based on the at least one evacuation path (EP).

What is claimed is:

1. A computer system for providing wildfire evacuation support, said computer system comprising:
    an input for receiving sensor data generated by at least one unmanned aerial vehicle while deployed within a target region that contains a wildfire, the at least one unmanned aerial vehicle being configured to generate, by use of one or more sensors, said sensor data that represents the wildfire with in the target region;
    at least one processor connected to said input and configured to:
        obtain a current location of an individual in a hazardous situation in the target region;
        obtain a desired destination for the individual in the target region;
        identify, based on the sensor data, one or more danger zones in the target region, the one or more danger zones posing a fire-related threat to the individual; and
        determine at least one evacuation path that extends from the current location to the desired destination while avoiding the one or more danger zones,
    wherein the computer system is configured to:
        represent in a configuration space of a path planning algorithm each of the one or more danger zones as an obstacle defined having a margin that represents a safe distance between the individual and the respective danger zone;
        set each of the margins of the obstacles based on at least one of wind data and/or a characteristic of the wildfire; and
        operate the path planning algorithm to determine the at least one evacuation path.

2. The computer system of claim 1, wherein the input is operable to receive sensor data that is representative of a location and extent of one or more confined fires within the wildfire, and an intensity of the one or more confined fires.

3. The computer system of claim 1, wherein the at least one processor is configured to obtain the current location of the individual by detecting the individual and determining the current location of the individual based on the sensor data.

4. The computer system of claim 1, wherein the input is operable to receive sensor data that represents real-time images.

5. The computer system of claim 4, wherein the input is operable to receive real-time infrared images.

6. The computer system of claim 1, wherein the at least one processor is configured to cause the at least one unmanned aerial vehicle to guide the individual based on the at least one evacuation path.

7. The computer system of claim 1, further configured to determine the characteristic of the wildfire based on the sensor data.

8. The computer system of claim 1, further configured to determine the characteristic of the wildfire comprising at least one of:
    a rate of spreading;
    a fire intensity; and/or
    a direction of spreading.

9. The computer system of claim 1, wherein the at least one processor is further configured to:
    determine, based on the sensor data, a mode of transportation of the individual; and
    determine the margin based on a shielding parameter associated with the determined mode of transportation.

10. The computer system of claim 1, wherein the at least one processor is further configured to:
    determine, based on the sensor data, a mode of transportation of the individual; and
    determine the at least one evacuation path based on the determined mode of transportation.

11. The computer system of claim 10, wherein the at least one processor is configured to determine the at least one evacuation path based on an estimated speed of the determined mode of transportation.

12. The computer system of claim 10, wherein the at least one processor is configured to determine the at least one evacuation path while excluding terrain in the target region that is untraversable by the mode of transportation.

13. The computer system of claim 1, further comprising an unmanned aerial vehicle (UAV) operatively coupled with the at least one processor.

14. The computer system of claim 1, wherein the at least one processor is configured to:
    repeatedly obtain the current location of the individual, and optionally the desired destination;
    identify the one or more danger zones in the target region; and
    determine said at least one evacuation path, such that said at least one evacuation path is updated over time as the individual moves through the target region.

15. The computer system of claim 1, wherein the at least one processor is further configured to identify the one or more danger zones in the target region, wherein a respective danger zone among the one or more danger zones corresponds to one or more of a confined fire within the wildfire and/or a storage of hazardous material.

16. A computer-implemented method of providing wildfire evacuation support, said method comprising:
    obtaining sensor data generated by one or more sensors on at least one unmanned aerial vehicle operated within a target region that contains a wildfire, the sensor data representing the wildfire within the target region;
    obtaining a current location of an individual in a hazardous situation in a target region that contains a wildfire;
    obtaining a desired destination in the target region; identifying, at least partly based on the sensor data, one or more danger zones in the target region, the one or more danger zones posing a fire-related threat to the individual;
    representing in a configuration space of a path planning algorithm each of the one or more danger zones as an obstacle defined having a margin that represents a safe distance between the individual and the respective danger zone;
    setting each of the margins of the obstacles based on at least one of wind data and/or a characteristic of the wildfire; and
    operating the path planning algorithm to determine at least one evacuation path that extends from the current location to the desired destination while avoiding the one or more danger zones.

17. A non-transitory computer-readable medium comprising computer instructions that, when executed by at least one processor, cause the at least one processor to the perform a method of comprising:
- obtaining sensor data generated by one or more sensors on at least one unmanned aerial vehicle operated within a target region that contains a wildfire, the sensor data representing the wildfire within the target region;
- obtaining a current location of an individual in a hazardous situation in a target region that contains a wildfire;
- obtaining a desired destination in the target region;
- identifying, at least partly based on the sensor data, one or more danger zones in the target region, the one or more danger zones posing a fire-related threat to the individual;
- representing in a configuration space of a path planning algorithm each of the one or more danger zones as an obstacle defined having a margin that represents a safe distance between the individual and the respective danger zone;
- setting each of the margins of the obstacles based on at least one of wind data and/or a characteristic of the wildfire; and
- operating the path planning algorithm to determine at least one evacuation path that extends from the current location to the desired destination while avoiding the one or more danger zones.

18. An unmanned aerial vehicle for deployment within a target region that contains a wildfire, the unmanned aerial vehicle comprising one or more sensors and being configured to:
- generate, by use of the one or more sensors, sensor data that represents the wildfire within the target region;
- obtain a current location of an individual in a hazardous situation in the target region;
- obtain a desired destination for the individual in the target region;
- identify, based on the sensor data, one or more danger zones in the target region, the one or more danger zones posing a fire-related threat to the individual; and
- determine at least one evacuation path that extends from the current location to the desired destination while avoiding the one or more danger zones.

19. The unmanned aerial vehicle of claim 18, further configured to:
- receive, from one or more further unmanned aerial vehicles among a plurality of unmanned aerial vehicles in operative communication with the unmanned aerial vehicle, further sensor data that represents the wildfire within the target region; and
- identify the one or more danger zones based on the sensor data and the further sensor data.

20. The unmanned aerial vehicle of claim 18, further configured to:
- select at least one unmanned aerial vehicle from among a plurality of unmanned aerial vehicles in operative communication with the unmanned aerial vehicle; and
- cause the selected at least one unmanned aerial vehicle to guide the individual based on the at least one evacuation path.

* * * * *